United States Patent
Choudhury et al.

(10) Patent No.: US 10,320,190 B2
(45) Date of Patent: Jun. 11, 2019

(54) LOAD PROFILE SELECTION IN ADAPTIVE DYNAMIC ISLANDING USING BATTERIES

(71) Applicant: International Business Machines Corporation, Armonk, NY (US)

(72) Inventors: Anamitra R. Choudhury, Bangalore (IN); Sampath Dechu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 15/014,515

(22) Filed: Feb. 3, 2016

(65) Prior Publication Data
US 2017/0220010 A1 Aug. 3, 2017

(51) Int. Cl.
*H02J 3/00* (2006.01)
*H02J 3/34* (2006.01)
*H02J 3/38* (2006.01)
*H02J 9/06* (2006.01)

(52) U.S. Cl.
CPC ........ *H02J 3/00* (2013.01); *H02J 3/34* (2013.01); *H02J 3/38* (2013.01); *H02J 9/06* (2013.01); *G05B 2219/2639* (2013.01); *H02J 2003/007* (2013.01); *H02J 2003/388* (2013.01); *Y02E 60/76* (2013.01); *Y04S 40/22* (2013.01)

(58) Field of Classification Search
CPC ...................................................... H02J 3/00
See application file for complete search history.

(56) References Cited

U.S. PATENT DOCUMENTS

| | | | |
|---|---|---|---|
| 4,337,401 A | 6/1982 | Olson | |
| 6,510,369 B1 | 1/2003 | Lacy | |
| 8,335,595 B2 | 12/2012 | Tolnar et al. | |
| 8,446,040 B2 | 5/2013 | Paik et al. | |

(Continued)

FOREIGN PATENT DOCUMENTS

WO 2013052678 A2 4/2013

OTHER PUBLICATIONS

Seron, M., "Receding Horizon Control," http://www.eng.newcastle.edu.au/eecs/cdsc/books/cce/Slides/RecedingHorizonControl.pdf, 2004.

(Continued)

*Primary Examiner* — Tejal Gami
(74) *Attorney, Agent, or Firm* — Ryan, Mason & Lewis, LLP (57) ABSTRACT

Methods, systems, and computer program products for load profile selection in islanding using batteries are provided herein. A computer-implemented method includes generating a usage pattern model for a battery based on (i) information pertaining to consumers of the battery, (ii) information pertaining to usage of the battery, and (iii) information pertaining to network outages, wherein the network is linked to the battery; selecting a subset of the consumers of the battery to supply energy from the battery, during a network outage, based on (i) the usage pattern model, (ii) the lifespan of the battery, (iii) performance of the network, (iv) historical consumption data attributed to each of the consumers, and (v) a predetermined minimum amount of energy required to be supplied to the consumers during a network outage; and outputting instructions to activate and/or deactivate distribution components within the network based on said selecting.

20 Claims, 4 Drawing Sheets

(56) References Cited

U.S. PATENT DOCUMENTS

| 8,751,036 B2 | 6/2014 | Darden, II et al. |
| 2007/0168088 A1 | 7/2007 | Ewing et al. |
| 2014/0005852 A1 | 1/2014 | Asghari et al. |
| 2016/0034011 A1* | 2/2016 | Tuleja .................... G05B 15/02 700/295 |
| 2016/0357165 A1* | 12/2016 | Stiefenhofer ........ G05B 19/042 |

OTHER PUBLICATIONS

Nourai et al., "Batteries included," IEEE power and energy magazine, 2010.
Engineers Edge, "Effects of Discharge Rate and Temperature on Battery Capacity and Life" http://www.engineersedge.com/battery/discharge_rate_temperature_effects_battery.htm, 2000.
IBM, "Problem Characteristics Affecting CPLEX Run Time," Sep. 2010, http://www-01.ibm.com/support/docview.wss?uid=swg21400040.

\* cited by examiner

LOAD PROFILE SELECTION IN ADAPTIVE DYNAMIC ISLANDING USING BATTERIES

FIELD

The present application generally relates to information technology, and, more particularly, to battery management.

BACKGROUND

Utilities can face outages in power distribution due, for example, to faults in a transmission and distribution network. Such outages can last for non-trivial amounts of times (such as several hours or more, for example) before power is restored, which can be detrimental to utility customers. Further, existing power distribution approaches fail to provide a mechanism for identifying and/or selecting particular customers/consumers for supplying energy from one or more batteries during an outage while also considering battery characteristics and honoring service level agreements between customers and utilities.

SUMMARY

In one embodiment of the present invention, techniques for load profile selection in adaptive dynamic islanding using batteries are provided. An exemplary computer-implemented method can include generating a usage pattern model for a battery based on (i) one or more items of information pertaining to multiple consumers of the battery, (ii) one or more items of information pertaining to usage of the battery, and (iii) one or more items of information pertaining to one or more network outages, wherein the network is linked to the battery. Such a method can also include selecting a subset of the multiple consumers of the battery, to supply energy from the battery during a network outage, based on (i) the generated usage pattern model for the battery, (ii) a metric pertaining to the lifespan of the battery, (iii) a metric pertaining to performance of the network, (iv) historical consumption data attributed to each of the multiple consumers, and (v) a predetermined minimum amount of energy required to be supplied to the multiple consumers during a network outage. Further, such a method can additionally include outputting instructions to activate and/or deactivate multiple distribution components within the network based on the selecting.

In another embodiment of the invention, an exemplary computer-implemented method can include generating a usage pattern model for each of multiple batteries connected to a power grid based on (i) one or more items of information pertaining to multiple consumers of the power grid, (ii) one or more items of information pertaining to usage of the battery, and (iii) one or more items of information pertaining to one or more power grid outages. Such a method can include selecting a subset of the multiple consumers of the battery, to supply energy from the battery during a network outage, based on (i) the generated usage pattern model for each of multiple batteries, (ii) historical consumption data attributed to each of the multiple consumers, (iii) a predetermined minimum amount of energy required to be supplied to the multiple consumers during a network outage, and (iv) at least one of (a) a metric that maximizes the lifespan of the battery, (b) a metric that maximizes the number of the consumers to be supplied energy, and (c) a metric that minimizes the number of power supply interruptions for the multiple consumers. Further, such a method can additionally include outputting instructions to activate and/ or deactivate multiple meters within the network based on the selecting to a metering infrastructure component within the power grid.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes load profile selection in adaptive dynamic islanding using utility scale batteries. As used herein, islanding refers to a process of supplying power, during an outage, to a subset of customers and/or consumers in a utility service area using distributed generation sources such as a micro-turbine, a power storage device, a renewable energy supply, etc. Additionally, adaptive dynamic islanding (ADI) refers to an islanding process that uses an advance meter infrastructure at customer premises to turn-on and/or turn-off power for each customer independently during an outage. Using ADI, loads can be differentiated and/or prioritized. By way of an example, during an outage, loads associated with hospitals, traffic controls and police stations can be differentiated and/or prioritized over loads associated with residences to supply power to the prioritized loads (wherein the remaining energy can be cycled for a subset of the non-prioritized loads).

As detailed herein, at least one embodiment of the invention can include implementing utility scale batteries for ADI. By way of example, utility scale lead-acid or lithium ion batteries can provide ancillary services in a utility network such as power quality, as well as time-shifted use of renewable energy. Additionally, a primary function of such batteries during an outage is to supply backup service. As also described herein, effective energy extracted from a battery can depend on one or more factors such as ambient temperature, discharge rate and depth of discharge. As used herein, "effective energy" refers to the total net energy discharged from a battery for given operating conditions such as temperature, discharge rate, depth of discharge, etc.

At least one embodiment of the invention includes optimally determining and/or selecting a set (or sub-set) of customers/consumers during ADI for effective usage of overall battery resources to serve a maximum amount of energy to customers during a particular time period. Such an embodiment can include monitoring customer locations, historical consumption data, outage duration data, outage history, service level agreements (SLAs) pertaining to a minimum power supply during outage, asset management (battery usage history and battery manufacturers data), and discharge profiles of one or more batteries to develop a model for usage patterns of batteries. Such a model for usage patterns can subsequently be utilized in conjunction with an optimization engine to determine and/or select a set of customers, in particular time periods of a power outage, to whom energy is to be supplied. Such an embodiment can additionally include minimizing interruption duration and/or frequency (caused by an outage), as measured using a system average interruption duration index (SAIDI) and/or a system average interruption frequency index (SAIFI), and maximizing the life of the one or more batteries in question.

Figure 1:
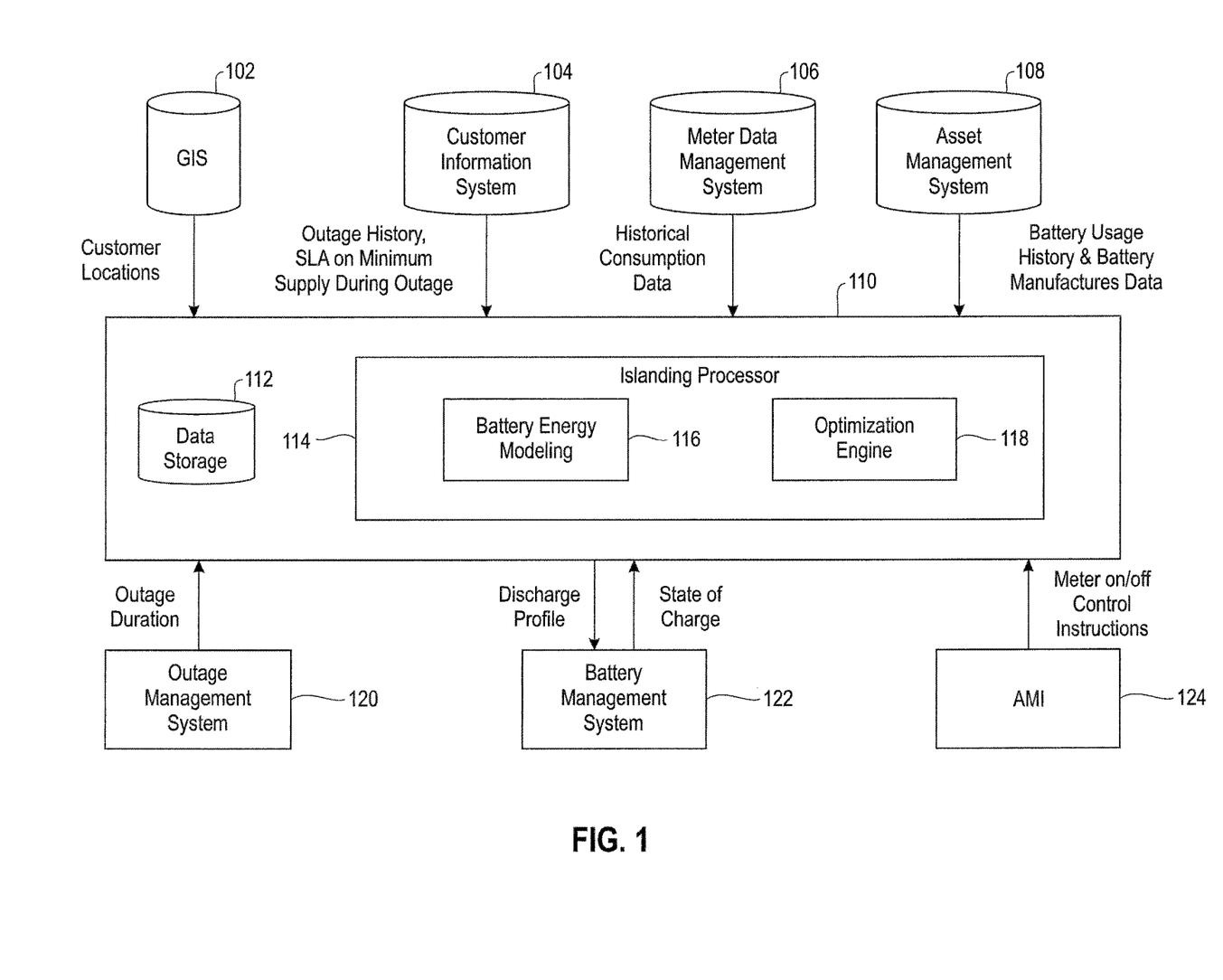
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a load profile selection component 110, which includes a data storage device 112 as well as an islanding processor 114, which includes a battery energy modeling component 116 and an optimization engine 118. In one or more embodiments of the invention, storage device 112 can maintain data such as, for example, manufacturer data regarding characteristics of the battery, models of the battery calculated based on the manufacturer's data, forecasted demand of consumers based on historical demands, and control information for various network elements to connect and disconnect the power.

FIG. 1 also depicts a geographic information system (GIS) database 102, which provides customer location information to the load profile selection component 110. Also, FIG. 1 depicts a customer information system database 104, which provides outage history information and SLAs pertaining to minimum supply requirements during outages to the load profile selection component 110. FIG. 1 also depicts a meter data management system database 106, which provides historical consumption data to the load profile selection component 110. Further, FIG. 1 depicts an asset management system database 108, which provides battery usage history and battery manufacturer data to the load profile selection component 110. By way of example, one or more embodiments of the invention can include using battery specifications derived from the asset management system database 108 to calculate energy availability for a given outage duration. The islanding processor 114 is connected to one or more additional databases, for example, via a network such as a local area network (LAN), a wide area network (WAN), or a WiFi® network. Additionally, one or more messaging protocols (such as, for example, representational state transfer (REST) application program interfaces (APIs) or message queue protocols) can be utilized to obtain information from all such databases.

As also depicted in FIG. 1, an outage management system 120 provides outage duration information to the load profile selection component 110, and a battery management system 122 provides state of charge information to the load profile selection component 110. The outage management system 120 can include a software management system used to manage outages in a given service area. Functional features of the system can include, for example, notifying a crew to repair an outage with relevant information, alerting consumers about an outage and messaging the consumers on an expected time of repair, and enabling backup supply options (such as storage). The battery management system 122 can include software that controls the operations of the battery, such as limiting battery output if operating currents are higher than rated currents, identifying the charge status of the battery, etc. As also noted above, the "state of charge" of a battery refers to the amount of energy left in the battery in relation to the total amount of energy that the battery can hold under standard operating conditions.

Based on the above-noted inputs to the load profile selection component 110, the load profile selection component 110 outputs one or more discharge profiles to the battery management system 122, and also outputs specific instructions to turn on and/or off particular meters (associated with particular customer/consumers) to an advanced metering infrastructure (AMI) component 124. As used herein, a "discharge profile" contains information such as when to operate the battery and at what rated current that battery is to operate, etc. Additionally, the load profile selection component 110 takes the inputs such as noted above and executes an optimization formulation (such as detailed below, for example) to identify a set of customers and the supply durations for each such customer during an outage period.

At least one embodiment of the invention can include prioritizing the given collection of customers for supply during an outage. Such an embodiment can include, for example, using historical consumption data for estimating bounds for consumer demand. Additionally, as detailed herein, one or more embodiments of the invention include identifying and selecting customers for supply of energy (during an outage) to minimize an interruption duration and/or frequency via optimization of grid utility metrics such as SAIFI or SAIDI, and/or to maximize battery life.

Figure 2:
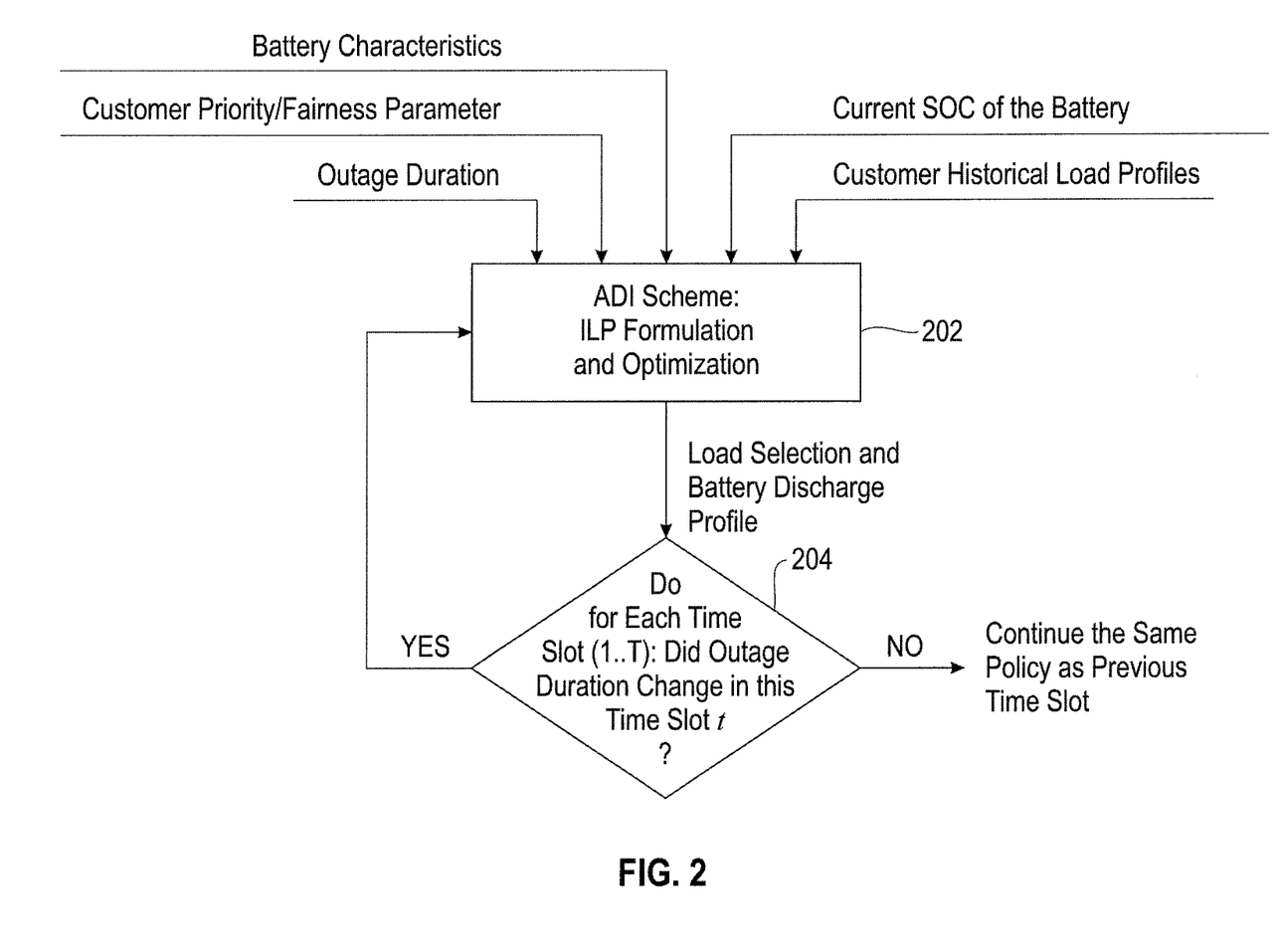
FIG. 2 is a flow diagram illustrating techniques according to an embodiment of the invention.

FIG. 2 is a flow diagram illustrating techniques according to an embodiment of the invention. By way of illustration, FIG. 2 depicts an integer linear programming (ILP) formulation and optimization (as further detailed herein) embedded in an ADI component 202. As detailed herein, ADI component 202 can implement a receding horizon control process, which enables time-coupled components to be accurately controlled in an uncertain environment.

As additionally depicted in FIG. 2, inputs including battery characteristics, one or more customer priority/fairness parameters (such as, for example, the minimum percentage of energy that needs to be supplied to one or more consumers), outage duration information, the current state of charge (SOC) of the battery, and historical customer load profiles are provided to the ADI component 202. The ADI component 202 processes such inputs and outputs load selection instructions and a battery discharge profile. Further, step 204 of FIG. 2 includes determining, for each of multiple time slots (1 . . . T), whether an outage duration changed during the time slot t. If yes (that is, the outage duration changed during time slot t), at least one embodiment of the invention includes returning to an implementation of the ADI component 202. If no (that is, the outage duration did not change during time slot t), at least one embodiment of the invention includes continuing with the same policy as was implemented in the previous time slot.

As noted herein, during an outage period, a battery can include different discharge rates, each with a corresponding battery life and a cost of operation. Also, in one or more scenarios, the battery can be discharged at only a set of time steps, and at every time step, a subset of customers can be served. Accordingly, in such a scenario, a customer can be served only at time steps when the battery is discharged. As such, the total energy served at a given time can be at most the energy drained from the battery. Also, in such scenarios, each customer/consumer should be served some fraction of his or her demand as specified in a relevant SLA.

As detailed herein, example metrics for monitoring grid reliability include SAIDI, which indicates the average duration of outage, and SAIFI, which quantifies the average number of interruptions for each customer.

As alternatively stated, SAIDI=(the sum of all customer interruption durations)/(the total number of customers served). This can also be noted as $$SAIDI = \frac{\Sigma(U_i * N_i)}{N_T},$$

wherein $N_i$=the number of customers for location i, $U_i$=the annual outage time for location i, and $N_T$=the number of customers served. Additionally, it can be noted that $$SAIFI = \frac{\Sigma \lambda_i N_i}{N_T},$$

wherein $N_i$=the number of customers for location i, $\lambda_i$=the failure rate for location i, and $N_T$=the number of customers served.

Accordingly, one or more embodiments of the invention can include minimizing SAIDI via maximizing the number of customer hours served, maximize battery life via minimizing the cost of battery operation, and/or minimizing SAIFI via minimizing the total number of interruptions for all customers. Such embodiments of the invention can additionally include implementing one or more algorithms that can include utilization of the following variables:

T=the number of hours of an outage duration;
C=the battery discharge profile set;
$y_c$=1 if the battery is on for configuration c∈C, else=0;
$x_{it}$=1 if the consumer i is served at time step t, else=0;
$z_{it}$=1 if there is an interruption for the customer/consumer i at time t;
$e_{it}$=the energy demand of the customer/consumer i at time step t (wherein $e_{it}$ is predicted and/or estimated based on historical data);
E(c)=the energy available in the battery (that is, the energy that can be drawn from the battery) for configuration c (wherein E(c) is derived from battery specifications data);
λ(c)=the cost of the battery for configuration c; and
p=the percentage of total demand that should be met during an outage.

Additionally, in an example embodiment of the invention that includes minimizing SAIDI via maximizing the number of customer hours served, minimizing SAIDI can include carrying out the following equation: max $\Sigma_{i,t} x_{it}$. Carrying out such an embodiment of the invention can additionally include the following steps:

$\Sigma_{c \in C} y_c = 1$, wherein the battery is on for only one configuration;

$x_{it} \leq \Sigma_{c|t \in c} y_c$, wherein the customer/consumer is allocated energy only if the battery is on;

$$\Sigma_i x_{it} e_{it} \leq E_c y_c * \frac{E(c)}{|c|}, \forall t,$$

wherein the total energy consumed in a slot/time step t is equal to the energy supplied in that slot/time step; and $\Sigma_t x_{it} e_{it} \geq p * \Sigma_t e_{it}, \forall i$, wherein the minimum energy served to a customer/consumer during an outage is at least some percentage of the total demand.

Also, in an example embodiment of the invention that includes maximizing battery life via minimizing the cost of battery operation, minimizing the cost of battery operation can include carrying out the following equation: min $\Sigma_c(\lambda(c)*y_c)$. Carrying out such an embodiment of the invention can additionally include the following steps:

$\Sigma_{c \in C} y_c = 1$, wherein the battery is on for only one configuration;

$x_{it} \leq \Sigma_{c|t \in c} y_c$, wherein the customer/consumer is allocated energy only if the battery is on;

$$\Sigma_i x_{it} e_{it} \leq E_c y_c * \frac{E(c)}{|c|}, \forall t,$$

wherein the total energy consumed in a slot/time step t is equal to the energy supplied in that slot/time step; and $\Sigma_t x_{it} e_{it} \geq p * \Sigma_t e_{it}, \forall i$, wherein the minimum energy served to a customer/consumer during an outage is at least some percentage of the total demand.

Additionally, in an example embodiment of the invention that includes minimizing SAIFI via minimizing the total number of interruptions for all customers, minimizing SAIFI can include carrying out the following equation: min $\Sigma_{i,t} z_{it}$. Carrying out such an embodiment of the invention can additionally include the following steps:

$\Sigma_{c \in C} y_c = 1$, wherein the battery is on for only one configuration;

$x_{it} \leq \Sigma_{c|t \in c} y_c$, wherein the customer/consumer is allocated energy only if the battery is on;

$$\Sigma_i x_{it} e_{it} \leq E_c y_c * \frac{E(c)}{|c|}, \forall t,$$

wherein the total energy consumed in a slot/time step t is equal to the energy supplied in that slot/time step;

$\Sigma_t x_{it} e_{it} \geq p * \Sigma_t e_{it}, \forall i$, wherein the minimum energy served to a customer/consumer during an outage is at least some percentage of the total demand;

$z_{it} \geq x_{i(t-1)} - x_{it}, \forall i, t > 1$, wherein the customer/consumer experiences an interruption if served at time t−1, but not served at time t; and $z_{i1} \geq 1 - x_{i1}, \forall i$, wherein the customer/consumer i experiences an interruption at the first time slot/time step if not served.

In one or more embodiments of the invention, maximizing SAIDI for a power outage duration can additionally include assuming that the battery is getting discharged at a constant rate during the outage. Such an embodiment can also include selecting the customer(s) with the lowest consumption based on historical data in each determined temporal interval (for example, every hour), re-calculating the discharge rate for every revision of the outage duration, and repeating the above-noted selection step. Fairness can be introduced in such an embodiment of the invention, for example, by ignoring customers/consumers that have been served the required minimum amount of energy.

Figure 3:
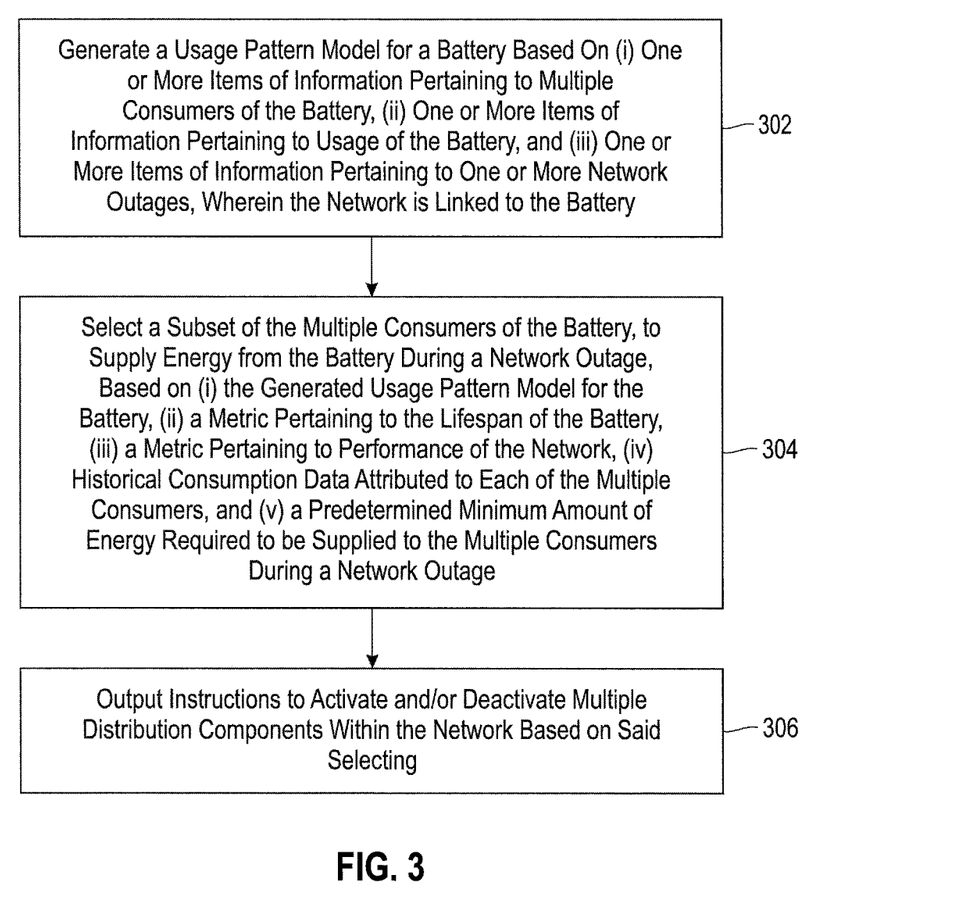
FIG. 3 is a flow diagram illustrating techniques according to an embodiment of the invention.

FIG. 3 is a flow diagram illustrating techniques according to an embodiment of the present invention. Step 302 includes generating a usage pattern model for a battery based on (i) one or more items of information pertaining to multiple consumers of the battery, (ii) one or more items of information pertaining to usage of the battery, and (iii) one or more items of information pertaining to one or more network outages, wherein the network is linked to the battery. The items of information pertaining to multiple consumers of the battery can include identification of a location of each of the multiple consumers. Additionally, generating the usage pattern model for a battery can be further based on one or more bounds for energy usage for each of the multiple consumers derived from historical usage data attributed to each of the multiple consumers.

The items of information pertaining to usage of the battery can include historical usage data of the battery and/or manufacturer data pertaining to one or more characteristics of the battery. Also, the items of information pertaining to one or more network outages can include a duration measure for each of the one or more network outages, and/or a frequency measure for each of the one or more network outages.

Step 304 includes selecting a subset of the multiple consumers of the battery, to supply energy from the battery during a network outage, based on (i) the generated usage pattern model for the battery, (ii) a metric pertaining to the lifespan of the battery, (iii) a metric pertaining to performance of the network, (iv) historical consumption data attributed to each of the multiple consumers, and (v) a predetermined minimum amount of energy required to be supplied to the multiple consumers during a network outage. The metric pertaining to performance of the network can include a system average interruption frequency index. The metric pertaining to performance of the network can include a system average interruption duration index. Additionally, the metric pertaining to the lifespan of the battery can include a number of charging and discharging cycles of the battery.

Step 306 includes outputting instructions to activate and/or deactivate multiple distribution components within the network based on said selecting. Additionally, the techniques depicted into FIG. 3 can include outputting one or more discharge profiles pertaining to the battery.

Also, an additional embodiment of the invention includes generating a usage pattern model for each of multiple batteries connected to a power grid based on (i) one or more items of information pertaining to multiple consumers of the power grid, (ii) one or more items of information pertaining to usage of the battery, and (iii) one or more items of information pertaining to one or more power grid outages. Such an embodiment can include selecting a subset of the multiple consumers of the battery, to supply energy from the battery during a network outage, based on (i) the generated usage pattern model for each of multiple batteries, (ii) historical consumption data attributed to each of the multiple consumers, (iii) a predetermined minimum amount of energy required to be supplied to the multiple consumers during a network outage, and (iv) at least one of (a) a metric that maximizes the lifespan of the battery, (b) a metric that maximizes the number of the consumers to be supplied energy, and (c) a metric that minimizes the number of power supply interruptions for the multiple consumers. Further, such an embodiment can additionally include outputting instructions to activate and/or deactivate multiple meters within the network based on the selecting to a metering infrastructure component within the power grid.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
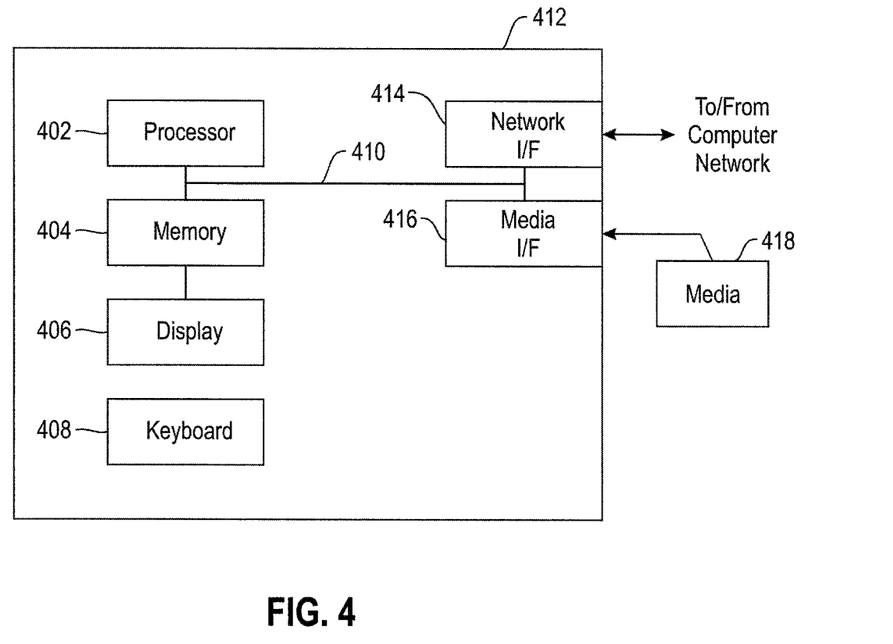
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, monitoring SLAs and asset management to optimally prioritize a set of customers in particular time periods of power outage.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    generating a usage pattern model for a battery based on (i) one or more items of information pertaining to multiple consumers of the battery, (ii) one or more items of information pertaining to usage of the battery, and (iii) one or more items of information pertaining to one or more network outages, wherein the network is linked to the battery;
    selecting a subset of the multiple consumers of the battery, to supply energy from the battery during a network outage, based on (i) the generated usage pattern model for the battery, (ii) a metric pertaining to the lifespan of the battery, (iii) a metric pertaining to performance of the network, (iv) historical consumption data attributed to each of the multiple consumers, and (v) a predetermined minimum amount of energy required to be supplied to the multiple consumers during a network outage; and
    outputting instructions, based on the selected subset of consumers, to at least one of (i) activate multiple distribution components within the network and (ii) deactivate multiple distribution components within the network;
    wherein the steps are carried out by at least one computing device.

2. The computer-implemented method of claim 1, wherein the one or more items of information pertaining to multiple consumers of the battery comprises identification of a location of each of the multiple consumers.

3. The computer-implemented method of claim 1, wherein said generating the usage pattern model for a battery is further based on one or more bounds for energy usage for each of the multiple consumers derived from historical usage data attributed to each of the multiple consumers.

4. The computer-implemented method of claim 1, wherein the one or more items of information pertaining to usage of the battery comprises historical usage data of the battery.

5. The computer-implemented method of claim 1, wherein the one or more items of information pertaining to usage of the battery comprises manufacturer data pertaining to one or more characteristics of the battery.

6. The computer-implemented method of claim 1, wherein the one or more items of information pertaining to one or more network outages comprises a duration measure for each of the one or more network outages.

7. The computer-implemented method of claim 1, wherein the one or more items of information pertaining to one or more network outages comprises a frequency measure for each of the one or more network outages.

8. The computer-implemented method of claim 1, wherein the metric pertaining to performance of the network comprises a system average interruption frequency index.

9. The computer-implemented method of claim 1, wherein the metric pertaining to performance of the network comprises a system average interruption duration index.

10. The computer-implemented method of claim 1, wherein the metric pertaining to the lifespan of the battery comprises a number of charging and discharging cycles of the battery.

11. The computer-implemented method of claim 1, comprising:
outputting one or more discharge profiles pertaining to the battery.

12. A computer program product comprising a computer readable storage medium having program instructions embodied therewith, the program instructions executable by a device to cause the device to:
generate a usage pattern model for a battery based on (i) one or more items of information pertaining to multiple consumers of the battery, (ii) one or more items of information pertaining to usage of the battery, and (iii) one or more items of information pertaining to one or more network outages, wherein the network is linked to the battery;
select a subset of the multiple consumers of the battery, to supply energy from the battery during a network outage, based on (i) the generated usage pattern model for the battery, (ii) a metric pertaining to the lifespan of the battery, (iii) a metric pertaining to performance of the network, (iv) historical consumption data attributed to each of the multiple consumers, and (v) a predetermined minimum amount of energy required to be supplied to the multiple consumers during a network outage; and
output instructions, based on the selected subset of consumers, to at least one of (i) activate multiple distribution components within the network and (ii) deactivate multiple distribution components within the network.

13. The computer program product of claim 12, wherein the metric pertaining to performance of the network comprises a system average interruption frequency index.

14. The computer program product of claim 12, wherein the metric pertaining to performance of the network comprises a system average interruption duration index.

15. The computer program product of claim 12, wherein the metric pertaining to the lifespan of the battery comprises a number of charging and discharging cycles of the battery.

16. The computer program product of claim 12, wherein the program instructions executable by a computing device further cause the computing device to:
output one or more discharge profiles pertaining to the battery.

17. The computer program product of claim 12, wherein the one or more items of information pertaining to one or more network outages comprises a duration measure for each of the one or more network outages.

18. The computer program product of claim 12, wherein the one or more items of information pertaining to one or more network outages comprises a frequency measure for each of the one or more network outages.

19. A system comprising:
a memory; and
at least one processor coupled to the memory and configured for:
generating a usage pattern model for a battery based on (i) one or more items of information pertaining to multiple consumers of the battery, (ii) one or more items of information pertaining to usage of the battery, and (iii) one or more items of information pertaining to one or more network outages, wherein the network is linked to the battery;
selecting a subset of the multiple consumers of the battery, to supply energy from the battery during a network outage, based on (i) the generated usage pattern model for the battery, (ii) a metric pertaining to the lifespan of the battery, (iii) a metric pertaining to performance of the network, (iv) historical consumption data attributed to each of the multiple consumers, and (v) a predetermined minimum amount of energy required to be supplied to the multiple consumers during a network outage; and
outputting instructions, based on the selected subset of consumers, to at least one of (i) activate multiple distribution components within the network and (ii) deactivate multiple distribution components within the network.

20. A computer-implemented method, comprising:
generating a usage pattern model for each of multiple batteries connected to a power grid based on (i) one or more items of information pertaining to multiple consumers of the power grid, (ii) one or more items of information pertaining to usage of the battery, and (iii) one or more items of information pertaining to one or more power grid outages;
selecting a subset of the multiple consumers of the battery, to supply energy from the battery during a network outage, based on (i) the generated usage pattern model for each of multiple batteries, (ii) historical consumption data attributed to each of the multiple consumers, (iii) a predetermined minimum amount of energy required to be supplied to the multiple consumers during a network outage, and (iv) at least one of (a) a metric that maximizes the lifespan of the battery, (b) a metric that maximizes the number of the consumers to be supplied energy, and (c) a metric that minimizes the number of power supply interruptions for the multiple consumers; and
outputting instructions, to a metering infrastructure component within the power grid and based on the selected subset of consumers, to at least one of (i) activate multiple meters within the network (ii) deactivate multiple meters within the network;
wherein the steps are carried out by at least one computing device.

* * * * *